United States Patent [19]

Weirich et al.

[11] 4,302,034
[45] Nov. 24, 1981

[54] HYDRAULIC COUPLING DEVICE

[75] Inventors: Walter Weirich, Dortmund; Gunther Hennlich, Hattingen, both of Fed. Rep. of Germany

[73] Assignee: Gewerkschaft Eisenhutte Westfalia, Lunen, Fed. Rep. of Germany

[21] Appl. No.: 136,868

[22] Filed: Apr. 3, 1980

[30] Foreign Application Priority Data

Apr. 5, 1979 [DE] Fed. Rep. of Germany ....... 2913686

[51] Int. Cl.³ ............................................. F16L 39/02
[52] U.S. Cl. ................................. 285/26; 285/137 R; 285/388
[58] Field of Search ................. 285/137 R, 24, 25, 26, 285/28, 29, DIG. 15, 388

[56] References Cited

U.S. PATENT DOCUMENTS

| 3,767,234 | 10/1973 | Weirich et al. | 285/137 R |
| 4,113,287 | 9/1978 | Bogatirev et al. | 285/137 R |
| 4,149,567 | 4/1979 | Weirich | 285/388 |

FOREIGN PATENT DOCUMENTS

| 1097687 | 4/1965 | United Kingdom | 285/137 R |
| 1403523 | 8/1975 | United Kingdom | 285/137 R |
| 381843 | 10/1973 | U.S.S.R. | 285/137 R |

Primary Examiner—Dave W. Arola
Attorney, Agent, or Firm—Sughrue, Mion, Zinn, Macpeak and Seas

[57] ABSTRACT

A hydraulic coupling device for a multi-line hose comprises a screw cap which houses a plurality of plug pins. The hose has a plurality of hydraulic lines bunched together within a flexible sheath. The hose is connected to the coupling device by means of a sleeve, and the lines are connected to the plug pins. Each of the plug pins has a collar. The collars are held against an apertured holding disc by abutment faces formed respectively on a retainer disc and the sleeve. The plug pins are mounted so as to have a predetermined amount of axial and radial play.

11 Claims, 2 Drawing Figures

HYDRAULIC COUPLING DEVICE

BACKGROUND TO THE INVENTION

This invention relates to a hydraulic coupling device for a multi-line hose. The invention is useful in the hydraulic distribution systems used in underground mine workings, particularly for hydraulic advanceable mine roof support assemblies and other hydraulic appliances.

Systems are known in which numerous hydraulic lines are bunched together to form multi-line hoses, which are interconnected by means of generally cylindrical plug couplings. A known plug coupling includes a coupling device having a plurality of plug pins, and a connector having a plurality of sockets which mate with the plug pins, the coupling device and the connector being attached to respective multi-line hoses. (see DE-OS No. 2059576).

This known type of coupling device has a casing which houses the plug pins, the plug pins being supported by a holder within the casing. Each of the plug pins is attached to the holder in such a manner as to permit a slight amount of axial and radial play so that the plug pins can easily be positioned within the sockets of the connector, without forcing or deformation. The holder is a disc provided with apertures for receiving the plug pins, the apertures lying on a common pitch circle. Each of the plug pins has a collar which engages one side of the disc, the plug pins being retained against the disc by means of small circlips which snap into grooves in the plug pins, the circlips engaging the other side of the disc.

Since, in general, the hoses have a relatively large number of lines, for example sixteen, the expense of manufacturing and assembling the plug pins in the disc using the small circlips, is considerable. Moreover, there is a danger of damage or destruction of the relatively weak circlips under the high operational forces.

Another known type of coupling device has plug pins which are held in position between a holder and a retainer, both of which are disc-like plates. The circumferential edge of the retainer engages the inner edges of the collars of the plug pins, and the retainer is bolted to the holder so that the inner edges of the collars are clamped between the retainer and the holder. Unfortunately, the firm clamping of the collars between the two disc-like plates can lead, during the tightening up of the two plates, to distortion of the relatively weak plug pins. This possibility of distortion is increased by the clamping forces acting only on the inner edges of the collars. Moreover, this type of coupling device is a relatively large and heavy construction, since the two plates lie at a relatively large axial separation.

SUMMARY OF THE INVENTION

The present invention provides a hydraulic coupling device for a multi-line hose comprising a plurality of hydraulic lines housed within a flexible sheath, the coupling device comprising a casing, a plurality of plug pins housed within the casing, and means for holding the plug pins within the casing, the plug pins each being connectible to a respective line of the hose, wherein each of the plug pins is provided with a collar, and wherein the holding means comprises a holder, a retainer and a sleeve, the collars being held against the holder by abutment faces on the retainer and the sleeve, and the sleeve being connectible to the sheath of the multi-line hose.

With this coupling device, the plug pins are held in position by the engagement of their collars between the abutment faces of the retainer and the sleeve and the holder. Consequently, the collars are reliably held against the holder by abutment faces on their inner and outer edges, the inner edges being engaged by the retainer and the outer edges by the sleeve.

Advantageously, the plug pins are positioned on a common pitch circle of the holder. Each of the plug pins may be mounted in a respective aperture in the holder, the apertures being smaller than the collars.

Preferably, the sleeve is formed with an internal shoulder which constitutes the abutment face of the sleeve, and the retainer is a circular plate whose circumferential edge constitutes the abutment face of the retainer.

Each of the plug pins may be held by the holding means so as to have a predetermined amount of both axial and radial play. Thus, the collars of the plug pins are not firmly clamped in position between the retainer and the holder, so that their insertion into the matching sockets of a hydraulic connector is facilitated. Also, the plug pins are free to rotate, so that twisting of the hydraulic lines of the associated hose cannot occur. Moreover, even where the associated hose is flexed or twisted, the plug pins are not subjected to any undesirable stresses or constraints.

Advantageously, the retainer is detachably secured to the holder preferably by means of a screw-threaded member. This results in a compact structure.

Preferably, the holder and the retainer are provided with interengaging alignment means.

The casing may be a screw cap which is axially locked, but rotatable, with respect to the sleeve by means of a circlip, the screw cap being formed with an inwardly-projecting annular shoulder which engages with a recessed portion of the holder.

BRIEF DESCRIPTION OF DRAWINGS

A hydraulic coupling device constructed in accordance with the invention will now be described, by way of example, with reference to the accompanying drawings, in which.

DESCRIPTION OF PREFERRED EMBODIMENT

Figure 1:
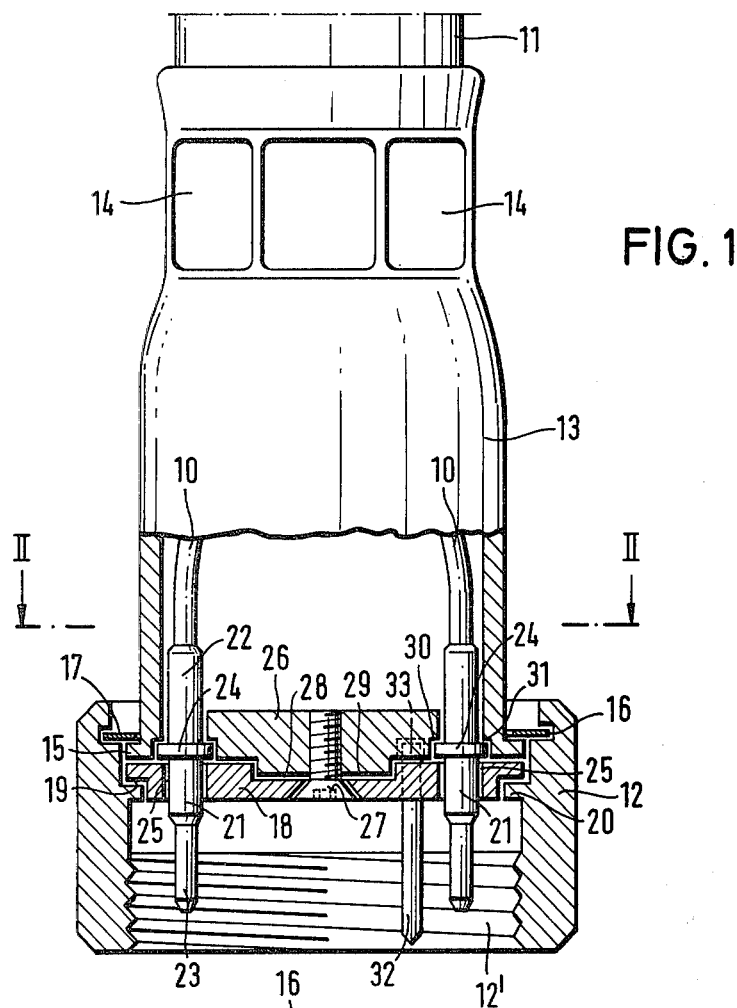
FIG. 1, is a part-sectional side elevation of the coupling device together with a hydraulic multi-line hose.
Figure 2:
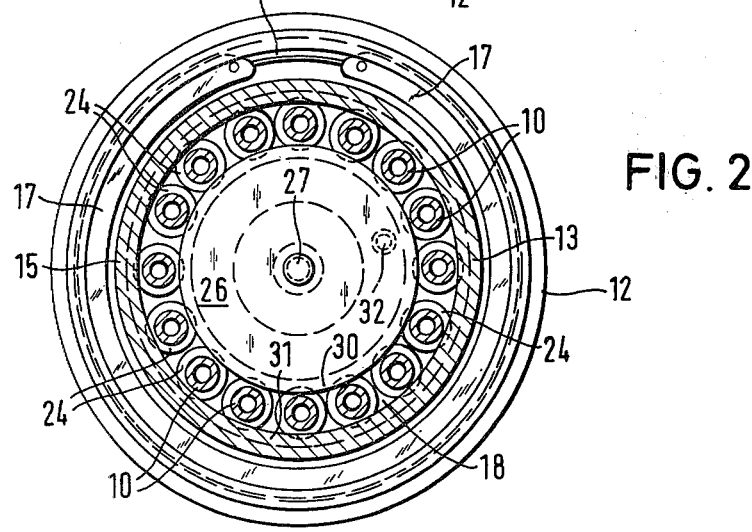
FIG. 2, is a cross-section taken on the line II—II of FIG. 1.

Referring to the drawings, FIG. 1 shows a hydraulic multi-line hose which is constituted by sixteen flexible conduits 10, the conduits being bunched together inside a flexible sheath 11. The end of the hose is attached to a hydraulic coupling device, which is itself connectible to a hydraulic connector (not shown). Usually, a hydraulic coupling device will be attached to each end of the hose.

The hydraulic coupling device has a casing 12, which takes the form of screw cap having an internal screw thread 12'. The end of the hose is attached to the screw cap 12 by means of a rigid sleeve 13, one end of which is attached to the hose by radially-impressed portions 14. The other end of the sleeve 13 has an outwardly-extending flange 15, which engages behind a circlip 17 positioned within an annular groove 16 formed in a recessed end portion of the screw cap 12. Thus, the screw cap 12 and the sleeve 13 are rotatable relative to one another, but are interconnected in an axially non-displaceable manner. They are, however, easily disengageable.

A circular holding disc 18 is held within the screw cap 12, the holding disc having an external diameter equal to that of the flange 15 of the sleeve 13. The circumferential edge of the holding disc 18 is formed with a recess 19, which engages with an inwardly-extending flange 20 formed within the screw cap 12. Thus, the holding disc 18 is axially held, and rotatable, between the flanges 15 and 20.

The free ends of the conduits 10 are each fitted within a socket 22 of a plug pin 21, the ends of the conduits being press-fitted into their respective sockets. The plug pins 21 are made of a high-strength synthetic plastics material, and each has an annular collar 24 and a nipple 23, the collar being positioned between the nipple and the corresponding socket 22. Instead of the collar 24, each plug pin 21 could be provided with any other form of radially-projecting member or members. The nipples 23 fit into sockets (not shown) of the associated hydraulic connector. The holding disc 18 is provided with sixteen apertures 25 for receiving the plug pins 21. The apertures 25 are circular, and their centres lie on a common pitch circle of the holding disc 18. The apertures 25 are slightly oversized with respect to the plug pins 21, so that the plug pins are seated with a small degree of radial play. The collars 24 of the plug pins 21 rest against the rear surface of the holding disc 18. The plug pins 21 are secured to the holding disc 18 by means of a circular retaining plate 26, which is removably attached to the holding disc by a central bolt 27. The retaining plate 26 is centered with respect to the holding disc 18 by the engagement of a central, circular recess 28 in the holding disc with a central circular projection 29 of the retaining plate. The circumferential edge of the retaining plate 26 is formed with a recess which defines an annular shoulder 30. The annular shoulder 30 is so positioned as to overlie, with a small clearance, the radially-inner portions of the collars 24 of the plug pins 21. Similarly, the radially-outer portions of the collars 24 are overlaid, with a small clearance, by an annular shoulder 31 defined by a recess formed in the inner peripheral edge of the sleeve 13. Thus, each of the plug pins 21 is held against the holding disc 18 at radially-opposed portions by the shoulders 30 and 31.

In order to assemble the coupling device, the free ends of the conduits 10 are press-fitted into the sockets 22 of the plug pins 21. The plug pins 21 are then positioned within the apertures 25 in the holding disc 18, and the retaining plate 26 is secured to the holding disc by means of the bolt 27. The screw cap 12 is then attached to the sleeve 13 with the aid of the circlip 17, the holding disc 18 being secured in position at the same time. The coupling device can easily be dismantled by removing the circlip 17 and disengaging the screw cap 12, so that the retaining plate 26 can be removed by unscrewing the bolt 27.

The holding disc 18 is provided with an alignment pin 32 for aligning the plug pins 21 with the sockets of the associated hydraulic connector. This alignment pin 32 has a rearwardly-extending projection 33 which engages within an aperture 34 in the retaining plate 26 so as to couple the holding disc 18 and the retaining plate rotatably together.

We claim:

1. A hydraulic coupling device for a multi-line hose having a plurality of hydraulic lines housed within a flexible sheath, the coupling device comprising a casing, a plurality of plug pins housed within the casing, and means for holding the plug pins within the casing, the plug pins each being connected to a respective line of the hose, wherein each of the plug pins is provided with a collar, and wherein the holding means comprises a holder, a retainer and a sleeve, the radially inner peripheral edges of the collars being loosely held against the holder by an abutment face on the retainer, the radially outer peripheral edges of the collars being loosely held against the holder by an abutment face on the sleeve, means for attaching the casing to the sleeve, and means for attaching the holder to the retainer, and the sleeve being connected to the sheath of the multi-line hose.

2. A coupling device according to claim 1, wherein the plug pins are positioned on a common pitch circle of the holder.

3. A coupling device according to claim 1, wherein each of the plug pins is mounted in a respective aperture in the holder, the apertures being smaller than the collars.

4. A coupling device according to claim 1, wherein the sleeve is formed with an internal shoulder which constitutes the abutment face of the sleeve.

5. A coupling device according to claim 1, wherein the retainer is a circular plate whose circumferential edge constitutes the abutment face of the retainer.

6. A coupling device according to claim 1, wherein each of the plug pins is held by the holding means so as to have a predetermined amount of both axial and radial play.

7. A coupling device according to claim 1, wherein the retainer is detachably secured to the holder.

8. A coupling device according to claim 7, wherein the retainer is secured to the holder by means of a screw-threaded member.

9. A coupling device according to claim 1, wherein the holder and the retainer are provided with interengaging alignment means.

10. A coupling device according to claim 1, wherein the casing is a screw cap which is axially locked, but rotatable, with respect to the sleeve by means of a circlip, the screw cap being formed with an inwardly-projecting annular shoulder which engages with a recessed portion of the holder.

11. In a hydraulic coupling arrangement comprising a hydraulic coupling device and a multi-line hose having a plurality of hydraulic lines housed within a flexible sheath, the coupling device comprising a casing, a plurality of plug pins housed within the casing, and means for holding the plug pins within the casing, the plug pins each being connected to a respective line of the hose, and each of the plug pins being provided with a collar, the improvements comprising providing a holder, a retainer and a sleeve which comprises the holding means, the radially inner peripheral edges of the collars being loosely held against the holder by an abutment face on the retainer, the radially outer peripheral edges of the collars being loosely held against the holder by an abutment face on the sleeve, means for attaching the casing to the sleeve, and means attaching the holder to the retainer, and the sleeve being connected to the sheath of the multi-line hose.

* * * * *